US012078132B2

(12) United States Patent
Iwamoto

(10) Patent No.: US 12,078,132 B2
(45) Date of Patent: Sep. 3, 2024

(54) EVAPORATED FUEL TREATMENT DEVICE

(71) Applicant: Futaba Industrial Co., Ltd., Okazaki (JP)

(72) Inventor: Koji Iwamoto, Okazaki (JP)

(73) Assignee: Futaba Industrial Co., Ltd., Okazaki (JP)

( * ) Notice: Subject to any disclaimer, the term of this patent is extended or adjusted under 35 U.S.C. 154(b) by 0 days.

(21) Appl. No.: 18/395,091

(22) Filed: Dec. 22, 2023

(65) Prior Publication Data

US 2024/0240601 A1 Jul. 18, 2024

(30) Foreign Application Priority Data

Jan. 12, 2023 (JP) ................................ 2023-003103

(51) Int. Cl.
*F02M 25/08* (2006.01)

(52) U.S. Cl.
CPC ................................ *F02M 25/089* (2013.01)

(58) Field of Classification Search
CPC ......................... F02M 25/089; F02M 25/0854
See application file for complete search history.

(56) References Cited

U.S. PATENT DOCUMENTS

2022/0252025 A1* 8/2022 Nakagawa ......... F02M 25/0854

FOREIGN PATENT DOCUMENTS

JP 2022120492 A 8/2022

* cited by examiner

*Primary Examiner* — Xiao En Mo
(74) *Attorney, Agent, or Firm* — Withrow + Terranova, PLLC; Vincent K. Gustafson

(57) ABSTRACT

Provided is an evaporated fuel treatment device. The evaporated fuel treatment device includes a main body case and a lid. The lid includes a target port, and is configured to be attached to the main body case on an attachment surface defined in advance in the main body case. The target port is configured to guide a gas in a direction intersecting a flow direction of the gas in a target adsorption chamber. The lid is configured to be rotated along a rotation direction prior to being attached to the main body case, to thereby (i) allow selection of one attachment angle from two or more attachment angles and (ii) be attached to the main body case.

3 Claims, 6 Drawing Sheets

EVAPORATED FUEL TREATMENT DEVICE

CROSS-REFERENCE TO RELATED APPLICATIONS

This application claims the benefit of Japanese Patent Application No. 2023-003103 filed on Jan. 12, 2023 with the Japan Patent Office, the entire disclosure of which is incorporated herein by reference.

BACKGROUND

The present disclosure relates to an evaporated fuel treatment device.

For example, Japanese Unexamined Patent Application Publication No. 2022-120492 discloses a configuration of an evaporated fuel treatment device whose opening in a main body case and a lid configured to close the opening are fixed by welding. The lid is provided with a port configured to make an inside and an outside of the evaporated fuel treatment device communicate with each other.

SUMMARY

Preferably, orientations of the port provided to the evaporated fuel treatment device can be changed in accordance with specifications of a vehicle or the like to which the evaporated fuel treatment device is mounted. However, the inventors of the subject application carefully studied the above configuration and found a problem that the above configuration requires development of components such as the lid, etc., and manufacturing jigs for every orientation of the port and therefore, the orientations of the port cannot be easily changed.

It is desirable that one aspect of the present disclosure facilitates change in orientations of a port in an evaporated fuel treatment device whose opening in a main body case and a lid are fixed.

One aspect of the present disclosure provides an evaporated fuel treatment device with two or more ports. The evaporated fuel treatment device comprises a main body case and a lid. The main body case includes two or more adsorption chambers and an opening. Each adsorption chamber of the two or more adsorption chambers accommodates an adsorbent therein. The opening allows a target adsorption chamber to communicate with the atmosphere. The target adsorption chamber is one of the two or more adsorption chambers.

The lid includes a target port, which is one of the two or more ports. The lid is configured to be attached to the main body case on an attachment surface, defined in advance in the main body case, so as to close at least a part of the opening. The target port is configured to guide a gas in a direction intersecting a flow direction of the gas in the target adsorption chamber. The lid is rotatable along a rotation direction prior to being attached to the main body case, to thereby (i) allow selection of one attachment angle from two or more attachment angles and (ii) be attached to the main body case.

The above configuration enables (i) selection of the one attachment angle of the lid from the two or more attachment angles and (ii) change in directions of guiding the gas by the target port in accordance with rotation of the lid. Thus, orientations of the target port can be variously changed by simply setting the attachment angle of the lid. Accordingly, the above configuration can facilitate change in the orientations of the port in the evaporated fuel treatment device whose opening in the main body case and the lid are fixed.

In one aspect of the present disclosure, the evaporated fuel treatment device may further comprise a rotation inhibitor configured to inhibit the lid attached to the main body case from being rotated along the rotation direction.

Such a configuration (i) makes the attachment angle of the lid settable prior to the lid being attached to the main body case and (ii) can inhibit the lid attached from being rotated.

In one aspect of the present disclosure, the evaporated fuel treatment device may further comprise two or more first engagement portions and two or more second engagement portions. The two or more first engagement portions are arranged in the main body case. The two or more second engagement portions are arranged in the lid, and configured to be engageable with the two or more first engagement portions, respectively. The two or more first engagement portions and the two or more second engagement portions may be arranged at respective positions that make the two or more first engagement portions and the two or more second engagement portions have rotational symmetry if rotated along the rotation direction.

The above configuration enables setting of the attachment angle of the lid for every position where the two or more first engagement portions and the two or more second engagement portions are engageable.

BRIEF DESCRIPTION OF THE DRAWINGS

Example embodiments of the present disclosure will be described hereinafter with reference to the accompanying drawings, in which.

DETAILED DESCRIPTION OF EXEMPLARY EMBODIMENTS

1. Embodiment

[1-1. Configuration]

Figure 1:
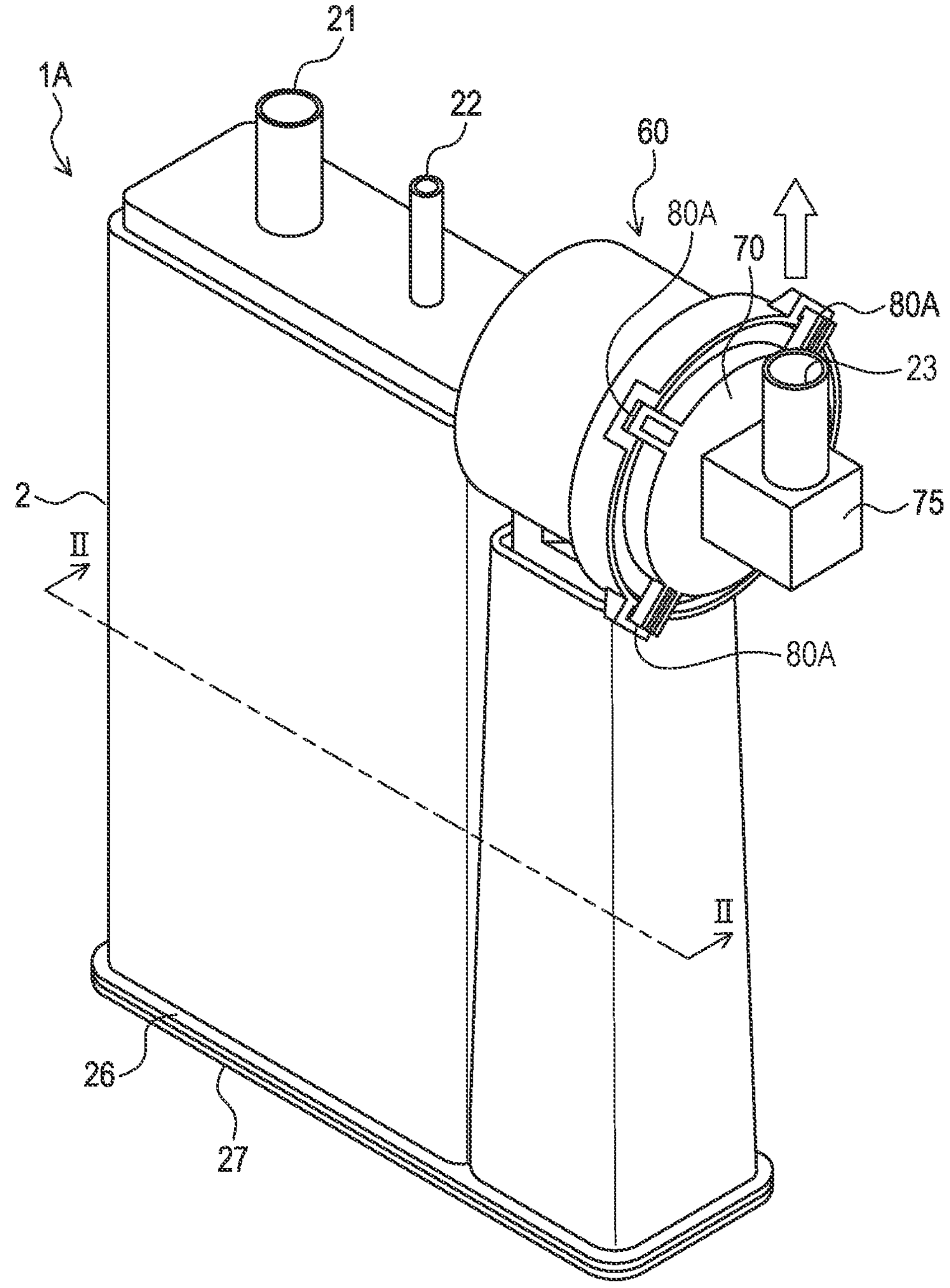
FIG. 1 is a perspective view illustrating an evaporated fuel treatment device according to an embodiment.

As illustrated in FIGS. 1, 2, 3A, and 3B, there is provided an evaporated fuel treatment device 1A comprising a function as a known canister. Specifically, the evaporated fuel treatment device 1A comprises a function to adsorb and desorb an evaporated fuel originating in a fuel tank (illustration omitted) of a vehicle. The evaporated fuel treatment device 1A comprises a main body case 2 and a lid 70.

The main body case 2 is a case including an inner space. The main body case 2 is, for example, a case made of synthetic resin. Materials of the main body case 2 are not limited to synthetic resin.

The main body case 2 comprises a charge port 21, a purge port 22, an atmosphere port 23, and an auxiliary chamber 60. The ports 21 through 23 are arranged on the same side in the main body case 2 (for example, an upper side in FIG. 1). These ports 21 through 23 are set to be oriented in the same direction (also referred to as "port direction"). The port direction is a direction to guide a gas to be discharged from the ports. The atmosphere port 23 corresponds to one example of the target port.

The gas described herein means a gas flowing inside the evaporated fuel treatment device 1A, and may contain the atmospheric air and the evaporated fuel.

Hereinafter, the side in the main body case 2 where the charge port 21, the purge port 22, and the atmosphere port 23 are provided is referred to as "port side". The main body case 2 includes an opening 26 on a side opposite to the port side. The opening 26 is closed by a cap 27 functioning as a lid.

The charge port 21 is coupled to the fuel tank of the vehicle via a pipe. The charge port 21 is configured to draw the evaporated fuel originating in the fuel tank into the evaporated fuel treatment device 1A.

The purge port 22 is coupled to an intake pipe (illustration omitted) of an engine (illustration omitted) of the vehicle via a purge valve. The purge port 22 is configured to discharge the evaporated fuel inside the evaporated fuel treatment device 1A so as to supply the same to the engine.

The atmosphere port 23 is provided to the lid 70. The atmosphere port 23 is coupled to a direction switcher 75, which is provided to the lid 70. The direction switcher 75 will be described later. The atmosphere port 23 is open to the atmosphere. The atmosphere port 23 is configured to discharge a gas removed of the evaporated fuel to the atmosphere. The atmosphere port 23 is configured to draw an external gas (that is, a purge gas), to thereby desorb (that is, purge) the evaporated fuel adsorbed by the evaporated fuel treatment device 1A.

Figure 2:
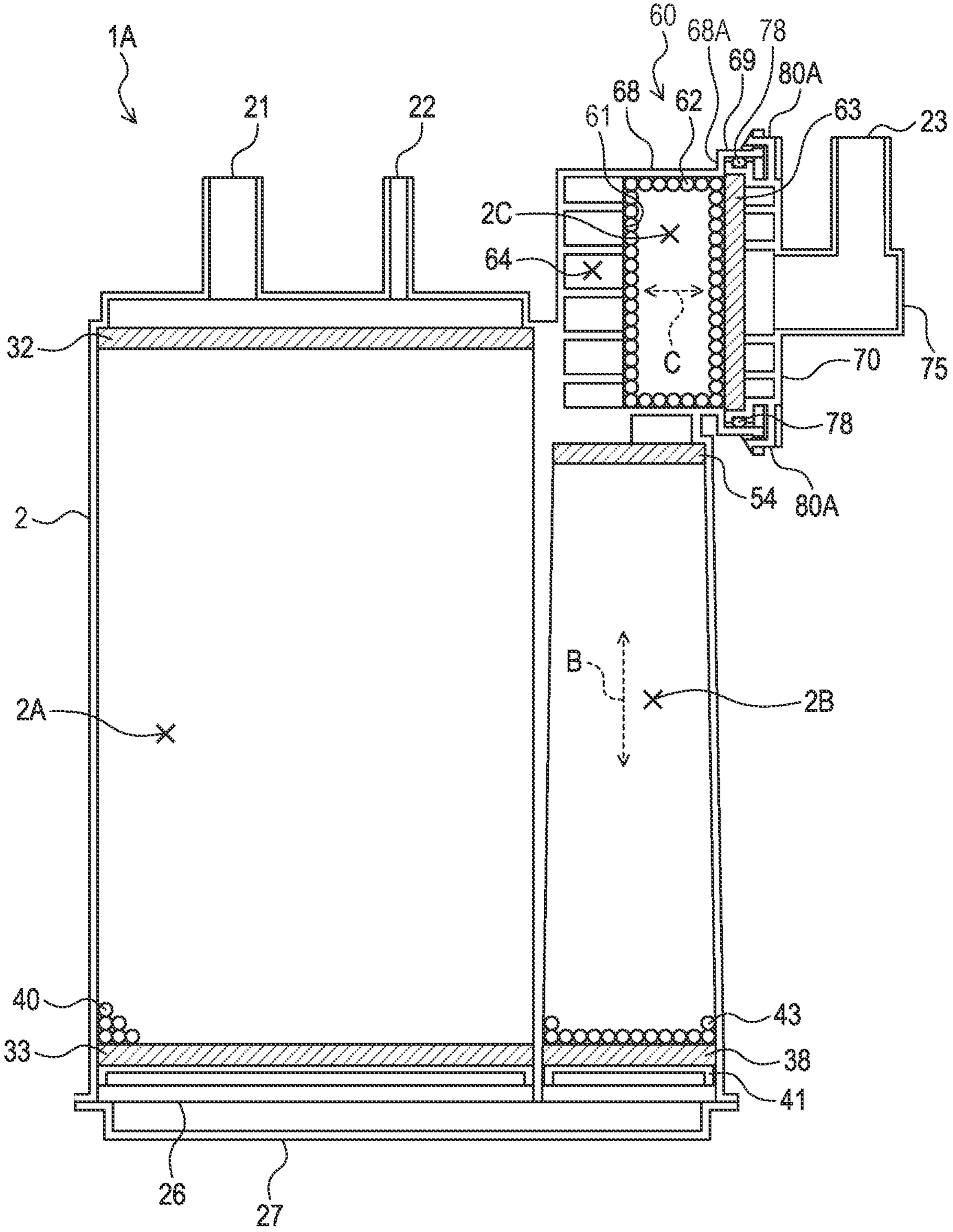
FIG. 2 is a cross-section view of the evaporated fuel treatment device along a line II-II in FIG. 1.

As illustrated in FIG. 2, the inner space of the main body case 2 is divided into a first chamber 2A, a second chamber 2B, and a third chamber 2C.

In one example, the first chamber 2A has a substantially rectangular parallelepiped shape, or a circular cylindrical shape. The first chamber 2A is coupled to the charge port 21 and the purge port 22 at an end thereof on the port side (hereinafter, referred to as "port side-end"). Furthermore, there is arranged a first filter 32 at the port side-end of the first chamber 2A. There is arranged a second filter 33 at an end of the first chamber 2A in the vicinity of the cap 27 (hereinafter, referred to as "cap side-end"). Between the first filter 32 and the second filter 33, there is arranged an adsorbent 40. In one example, the adsorbent 40 is an aggregate of two or more pellets. The pellets are granular activated carbon. The pellets are produced by kneading powdery activated carbon with a binder and then forming a resulting activated carbon into a specific shape. Alternatively, there may be arranged, for example, an adsorbent such as powdery activated carbon in the first chamber 2A other than the pellets.

The first chamber 2A is coupled to the second chamber 2B via the cap side-end thereof. The gas, such as the gas containing the evaporated fuel, can travel back and forth inside the main body case 2 between the first chamber 2A and the second chamber 2B.

The second chamber 2B is a space having an elongated shape that extends toward the atmosphere port 23 from an end of the second chamber 2B in the vicinity of the cap 27 (hereinafter, referred to as "cap side-end"). In one example, the second chamber 2B has a substantially rectangular parallelepiped shape or a circular cylindrical shape. The second chamber 2B is coupled to the third chamber 2C at an end thereof on the port side (hereinafter, referred to as "port side-end"). Furthermore, the cap side-end of the second chamber 2B is provided with a first filter 38; and the port side-end of the second chamber 2B is provided with a second filter 54. In the second chamber 2B, there is arranged an adsorbent 43 in a space between the first filter 38 and the second filter 54. It should be noted that the adsorbent 43 may be of the same type as or a different type from the adsorbent 40.

The auxiliary chamber 60 includes a third chamber 2C. The third chamber 2C is a space in the vicinity of the second filter 54 of the second chamber 2B.

Figure 3A:
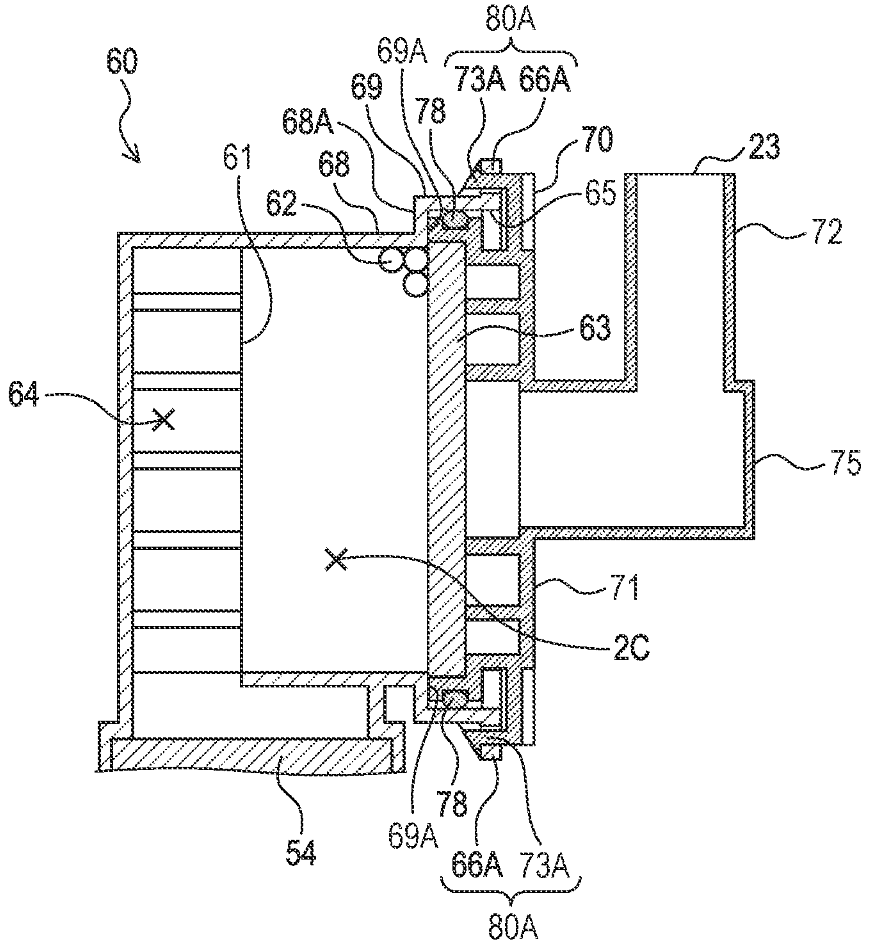
FIG. 3A is an enlarged cross-section view of a vicinity of an auxiliary chamber.
Figure 3B:
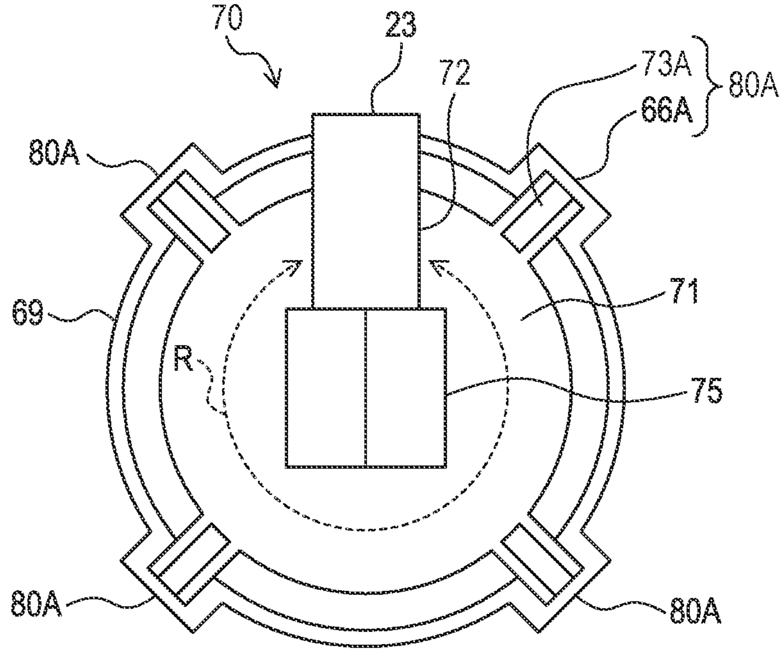
FIG. 3B is a right-side view of the vicinity of the auxiliary chamber.

As illustrated in FIGS. 3A and 3B, the auxiliary chamber 60 comprises a contact portion 61, an adsorber 62, a filter 63, an opening 65, a first engagement portion 66A, a retaining portion 68, a stepped portion 68A, and a large-diameter portion 69. The adsorber 62 is inserted into the third chamber 2C through the opening 65.

The third chamber 2C in the auxiliary chamber 60 is formed to have a smaller volume (specifically, a volume of an inner space and an external volume) as compared to a volume of the second chamber 2B in the vicinity thereof. In other words, when the second chamber 2B is defined as a main chamber having a relatively greater volume, the third chamber 2C is defined as an auxiliary chamber having a relatively smaller volume.

The contact portion 61 is a portion configured to contact the adsorber 62 when the adsorber 62 is inserted into the third chamber 2C through the opening 65. The contact portion 61 is configured to contact the adsorber 62 to thereby retain the adsorber 62. The contact portion 61 is used so as to position the adsorber 62 such that a switching space 64 is formed rearward of the adsorber 62 in an insertion direction of the adsorber 62 (leftward in FIG. 3A). The switching space 64 will be described later.

Examples of the adsorber 62 may include an activated carbon unit. Examples of the activated carbon unit may include: granular activated carbon; activated carbon formed into a honeycomb activated carbon, an activated carbon monolith, or the like; and activated carbon formed into a sheet, a cuboid shape, a columnar shape, a polygonal prism shape, or the like using a fibrous activated carbon. The adsorber 62 may be in the form different from the aforementioned form as long as the adsorber 62 is unitized.

In the first chamber 2A and the second chamber 2B, the gas mainly flows in a direction (hereinafter, simply referred to as "flow direction") from the first filters 32 and 38 toward the second filters 33 and 54, or an opposite flow direction thereto (that is, an up-down direction indicated by a broken line arrow B in FIG. 2). In contrast, the third chamber 2C is provided with the switching space 64 configured to switch the flow directions and in the switching space 64, the flow directions of the gas are switched to a direction toward the lid 70 or an opposite direction thereto. Specifically, the flow direction in the third chamber 2C is the direction from the switching space 64 toward the lid 70, or an opposite direction thereto (that is, a left-right direction indicated by a broken line arrow C in FIG. 2). In other words, the flow direction in the third chamber 2C intersects the flow direction in the first chamber 2A and the second chamber 2B. More specifically, the flow direction in the third chamber 2C is a left-right direction orthogonal to the up-down direction in FIG. 2.

The filter 63 is arranged closer to the lid 70 with respect to the adsorber 62 (rightward of the adsorber 62 in FIG. 3A). The adsorber 62 is formed such that a surface thereof facing the filter 63 is flush with a surface of the stepped portion 68A facing the lid 70, which is also referred to as "attachment surface 69A". In other words, along the insertion direction, the adsorber 62 has a height corresponding to a height of the auxiliary chamber 60 from the contact portion 61 to the attachment surface 69A.

The filter 63 is configured to receive a pressing force from the lid 70 upon the lid 70 being attached to the auxiliary chamber 60. Thus, the adsorber 62 is configured to be substantially immovably retained due to the pressing force from the filter 63 and a reaction force from the contact portion 61.

The retaining portion 68 is a portion retaining an outer peripheral part of the adsorber 62 with respect to the insertion direction (for example, top and bottom of the adsorber 62 in FIG. 3A). The outer peripheral part with respect to the insertion direction is, in other words, an outer peripheral part of the adsorber 62 parallel to the flow direction of the gas. The retaining portion 68 has an inner surface formed into a circular cylindrical shape corresponding to a shape of the outer peripheral part of the adsorber 62. In these configurations, the outer peripheral part of the adsorber 62 with respect to the insertion direction is configured to contact the retaining portion 68 of the main body case 2.

The large-diameter portion 69 is arranged so as to surround the lid 70 at a position away from the adsorber 62 in an opposite direction with respect to the retaining portion 68 (that is, at a position radially outward of the retaining portion 68). In other words, the large-diameter portion 69 has an outer diameter larger than an outer diameter of the retaining portion 68.

The stepped portion 68A forms a step coupling the retaining portion 68 and the large-diameter portion 69. The stepped portion 68A forms a surface perpendicular to the retaining portion 68 and the large-diameter portion 69. The stepped portion 68A includes an inner surface (a right-side surface in FIG. 3A), which is the attachment surface 69A (joining surface) between the main body case 2 and the lid 70.

The opening 65 is a portion allowing the third chamber 2C to communicate with the atmosphere. The opening 65 is an end of the large-diameter portion 69 opposite to the stepped portion 68A.

The lid 70 closes at least a part of the opening 65. As illustrated in FIGS. 3A and 3B, the lid 70 comprises a second engagement portion 73A, a main body 71 having a disk-shape, a pipe 72 coupled to the main body 71, and the direction switcher 75. The pipe 72 includes an open end forming the atmosphere port 23.

There is arranged a sealing member 78 between an outer circumference of the lid 70 and the large-diameter portion 69. In the lid 70, the atmosphere port 23 is configured to communicate with the main body case 2 via a direction switcher 75. The direction switcher 75 has a substantially rectangular parallelepiped shape, and includes a space so as to carry the gas therein. The direction switcher 75 having the substantially rectangular parallelepiped shape includes a facing surface that faces a main body 71 (that is, a substantially circular part) of the lid 70. One side surface of four side surfaces of the direction switcher 75 in contact with the facing surface is provided with, at any position thereof, a pipe 72 such that the atmosphere port 23 is oriented in a direction orthogonal to the one side surface. It is sufficient that the one side surface of the direction switcher 75 to which the atmosphere port 23 is provided and an orientation of the atmosphere port 23 intersect each other. That is, the one side surface of the direction switcher 75 and the orientation of the atmosphere 23 may not necessarily be orthogonal to each other. Furthermore, the direction switcher 75 is formed such that the main body 71 of the lid 70 and the pipe 72 are coupled with airtightness being allowed therebetween.

The sealing member 78 is configured to close a space between the opening 65 and the lid 70 over an entire circumference of the space. The sealing member 78 is a member having an annular shape. The annular shape includes a circular shape, an oval shape, a polygonal shape. That is, the annular shape means a shape surrounding an entire circumference of a hole.

The sealing member 78 may be, for example, an O-ring. The sealing member 78 closely seals the space around the outer circumference of the lid 70 with respect to the opening 65. With respect to the atmosphere port 23, however, the opening 65 remains open without being closed since the lid 70 is provided with the atmosphere port 23 communicating with the atmosphere.

It should be noted that the atmosphere port 23 may be coupled to any module such as an evaporative leak check module (also referred to as "ELCM"). The ELCM is a module configured to perform a leak inspection on the evaporated fuel treatment device 1A.

The lid 70 is configured to be fixed to the main body case 2 with a snap-fit structure 80A. The snap-fit structure 80A corresponds to one example of the rotation inhibitor in the present disclosure. The snap-fit structure 80A is a structure that employs a method of fitting a protrusion into a recess by taking advantage of elasticity of a material, to thereby fix the protrusion and the recess. In the present embodiment, the first engagement portion 66A and the second engagement portion 73A are configured to be engaged, whereby the lid 70 is attached to the main body case 2. The first engagement portion 66A is a recess provided in an outer circumference of the large-diameter portion 69 in the main body case 2. The second engagement portion 73A is a protrusion provided to the outer circumference of the lid 70.

In the foregoing configuration, when the lid 70 is inserted along the large-diameter portion 69, the second engagement portion 73A of the lid 70 is bent toward an inner circumference of the lid 70. Upon the second engagement portion 73A being fitted into the first engagement portion 66A of the main body case 2, the second engagement portion 73A is released from being bent, whereby the first engagement portion 66A and the second engagement portion 73A remain engaged. In other words, the lid 70 is fixed to the main body case 2.

In an example according to the present embodiment, there are provided four snap-fit structures 80A as illustrated in FIG. 3B. The snap-fit structures 80A are arranged at respective positions that make the snap-fit structure 80A have rotational symmetry if rotated along a rotation direction R (see, FIG. 3B). The rotation direction R is a direction in which the lid 70 is rotated along the attachment surface 69A. The four snap-fit structures 80A are arranged at equal intervals of 90 degrees, which is obtained by dividing 360 degrees by four (4), the number of the snap-fit structures 80A. It should be noted that the four snap-fit structures 80A are configured such that each of the first engagement portions 66A is engageable with a corresponding one of the second engagement portions 73A. In the present embodiment, all the first engagement portions 66A are formed in the same shape; and similarly, all the second engagement portions 73A are formed in the same shape.

The atmosphere port 23 provided to the lid 70 is configured to guide the gas in a direction intersecting the flow direction of the gas in the third chamber 2C. In the example according to the present embodiment, the atmosphere port 23 can be directed to any direction along the attachment surface 69A between the lid 70 and the main body case 2.

Figure 4A:
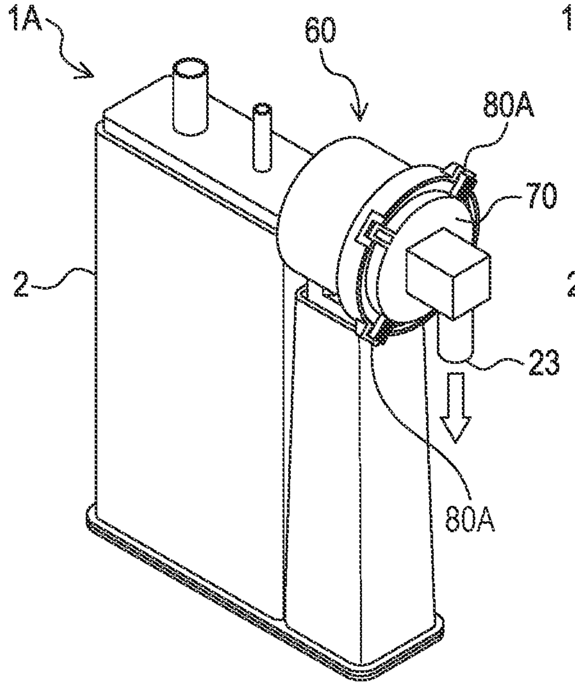
FIG. 4A is a perspective view of a lid having an installation angle of 180 degrees.
Figure 4B:
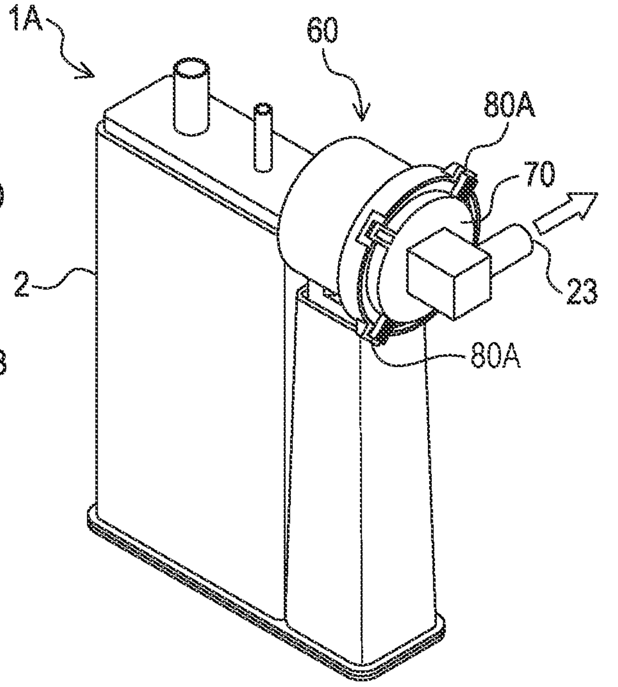
FIG. 4B is a perspective view of the lid having the installation angle of 90 degrees.
Figure 4C:
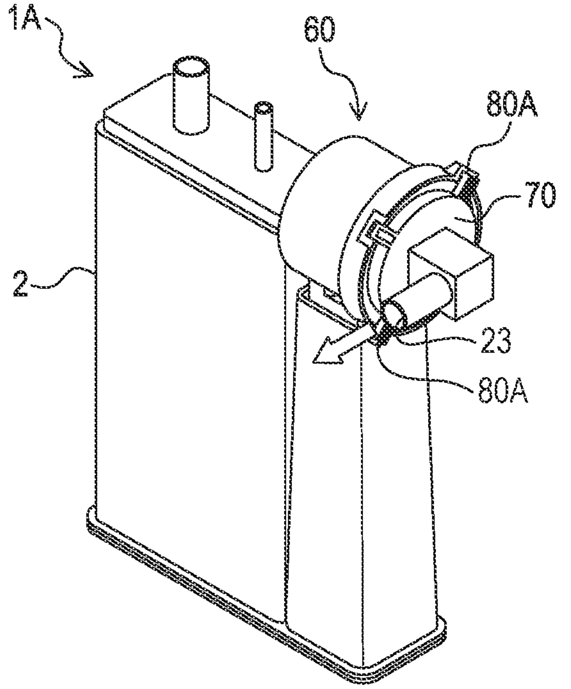
FIG. 4C is a perspective view of the lid having the installation angle of minus (−) 90 degrees.

In the above configuration, the lid 70 is rotated along the rotation direction R prior to being joined to the main body case 2, whereby one attachment angle can be selected from two or more attachment angles. The lid 70 is attached to the main body case 2 upon selection of the attachment angle. It should be noted that the attachment angle is an angle of rotation with respect to a referential axis (for example, an angle in a clockwise direction as a forward direction). For example, as illustrated in FIG. 1, the referential axis is an axis along which the atmosphere port 23 is oriented in the same direction as the charge port 21 and the purge port 22. In this case, when the atmosphere port 23 is oriented in an opposite direction to the charge port 21 and the purge port 22 as in FIG. 4A, the attachment angle is 180 degrees. As in FIGS. 4B and 4C, when the atmosphere port 23 is rotated by 90 degrees with respect to the reference axis, the attachment angle is 90 degrees or minus (−) 90 degrees. In other words, in a configuration of providing the four snap-fit structures 80A, the one attachment angle can be selected from four attachment angles.

As illustrated in FIG. 3B, the snap-fit structure 80A suppresses rotation along the rotation direction R of the lid 70 attached (attached lid 70).

In the evaporated fuel treatment device 1A, the lid 70 is configured to be attached to the main body case 2 while pressing the adsorber 62 via the filter 63. Thus, the lid 70 is configured to be arranged in the vicinity of the adsorber 62. In other words, the lid 70 is configured to be arranged on a path where the adsorber 62 moves toward the opening 65 (that is, arranged closer to the opening 65 with respect to the adsorber 62). It can be also said that the lid 70 comprises a function to apply a pressure to the adsorber 62 from the opening 65 to thereby suppress movement of the adsorber 62.

In the above-described embodiment, the snap-fit structure 80A comprises a function to suppress rotation of the attached lid 70. In place of the snap-fit structure 80A, however, a different configuration may be used to provide a function to suppress rotation of the attached lid 70. For example, a configuration of providing a greater frictional force with an O-ring may be adopted, to thereby suppress rotation of the attached lid 70. Alternatively, the attachment surface 69A of the main body case 2 may be formed into a polygonal shape; and the lid 70 may be formed into a polygonal shape corresponding to the shape of the attachment surface 69A. In these configurations, the snap-fit structure 80A can be eliminated as long as the lid 70 can be fixed to the main body case 2.

In the above-described embodiment, the lid 70 and the main body case 2 are assembled with the snap-fit structure 80A. However, the lid 70 and the main body case 2 are not limited to this configuration. For example, there may be a configuration of engaging any one or more first engagement portions 66A and any one or more second engagement portions 73A, a configuration of utilizing adhesive agent, and the like.

[1-2. Effects]

The embodiment described above in details exhibits effects to be described below.

(1a) The evaporated fuel treatment device 1A comprises the main body case 2, the lid 70, and the ports 21 through 23. The main body case 2 comprises adsorption chambers 2A through 2C and the opening 65. Each adsorption chamber of the adsorption chambers 2A through 2C accommodates adsorbents therein. The opening 65 allows a target adsorption chamber to communicate with the atmosphere. The target adsorption chamber is one of the adsorption chambers 2A through 2C. The lid 70 comprises the atmosphere port 23, which is one of the ports 21 through 23. The lid 70 is configured to be attached to the main body case 2 on the attachment surface 69A defined in advance in the main body case 2 so as to close at least a part of the opening 65. The atmosphere port 23 is configured to guide the gas in the direction intersecting the flow direction of the gas in the target adsorption chamber. The lid 70 is configured to be rotated along the rotation direction R prior to being attached to the main body case 2, to thereby allow selection of the one attachment angle from the two or more attachment angles and be attached to the main body case 2.

The above configuration enables (i) selection of one attachment angle of the lid 70 from the two or more attachment angles and (ii) change in directions of guiding the gas by the atmosphere port 23 in accordance with rotation of the lid 70. Consequently, orientations of the atmosphere port 23 can be variously changed by setting the attachment angle of the lid 70. Accordingly, the above configuration enables port directions to be easily changed in the evaporated fuel treatment device 1A whose opening 65 in the main body case 2 and the lid 70 are fixed.

(1b) In the present embodiment, there is also provided the snap-fit structure 80A. The snap-fit structure 80A is configured to suppress rotation along the rotation direction R of the lid 70 attached to the main body case 2.

Such a configuration enables setting of the attachment angle of the lid 70 prior to prior to the lid 70 being attached, and suppresses rotation of the lid 70 attached.

(1c) In the present embodiment, there may be also provided two or more first engagement portions 66A and two or more second engagement portions 73A. In this case, the two or more first engagement portions 66A are arranged in the main body case 2. The two or more second engagement portions 73A are arranged in the lid 70 and configured to be engageable with the two or more first engagement portions 66A, respectively. The two or more first engagement portions 66A and the two or more second engagement portions 73A may be arranged at respective positions that make these engagement portions have rotational symmetry if rotated along the rotation direction R.

Such a configuration enables setting of the attachment angle of the lid 70 for every position where the two or more first engagement portions 66A and the two or more second engagement portions 73A are engageable.

2. Other Embodiments

Although the embodiment of the present disclosure has been described hereinabove, the present disclosure is not limited to the embodiment, and can be variously modified.

(2a) The snap-fit structure 80A utilized in the above-described embodiment may be formed into any shape. In place of the snap-fit structure, there may be any lock mechanism configured to fix the lid 70 and the main body case 2.

(2b) In the above-described embodiment, the auxiliary chamber 60 is formed such that the lid 70 is attached to the main body case 2 in a direction from a distal side with respect to the charge port 21 (a right-side in FIG. 2) toward the charge port 21. However, the auxiliary chamber 60 is not limited to this configuration. For example, the auxiliary chamber 60 may be replaced with an auxiliary chamber 60B as in an evaporated fuel treatment device 1B according to a second modified example illustrated in FIGS. 5A through 5D. The auxiliary chamber 60B is configured such that the lid 70 is attached from the port side.

Figure 5A:
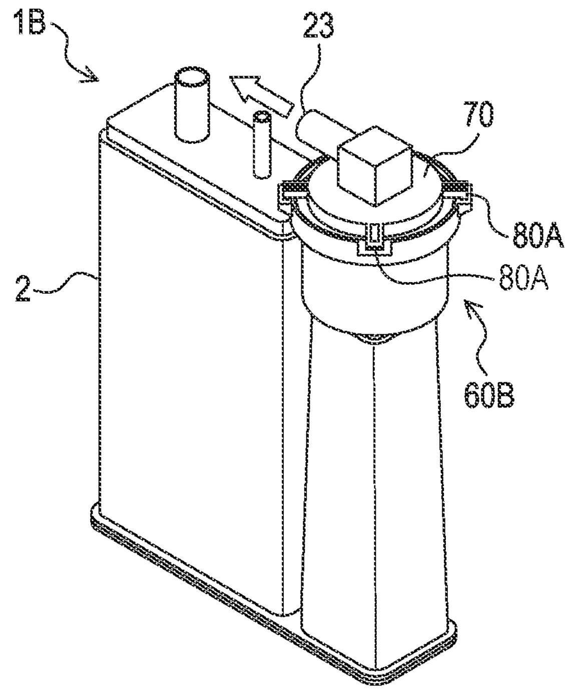
FIG. 5A is a perspective view illustrating a lid having an installation angle of 0 (zero) degree in an evaporated fuel treatment device according to a first modified example.
Figure 5B:
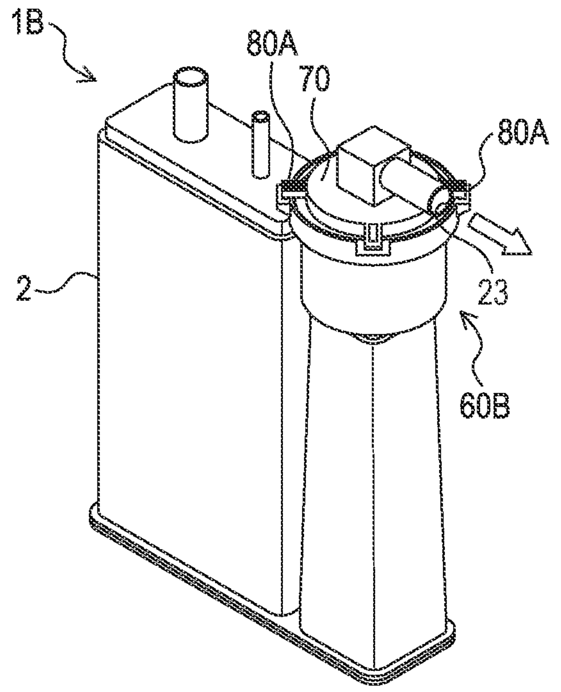
FIG. 5B is a perspective view of the lid having the installation angle of 180 degrees.
Figure 5C:
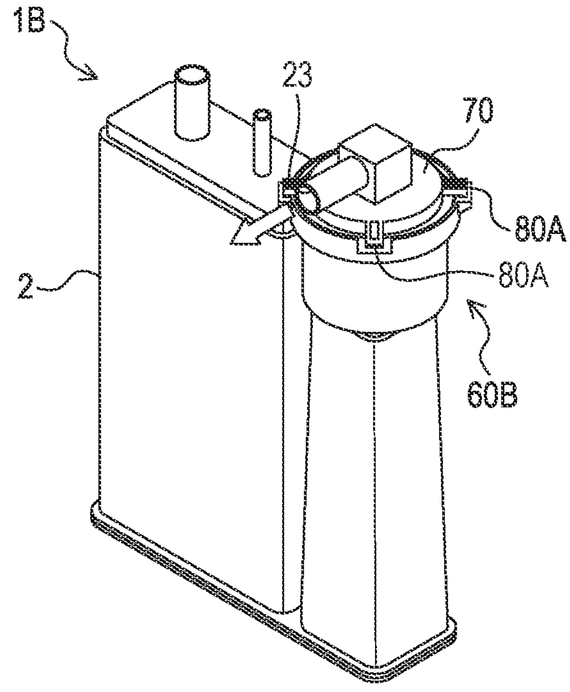
FIG. 5C is a perspective view of the lid having the installation angle of minus (−) 90 degrees.
Figure 5D:
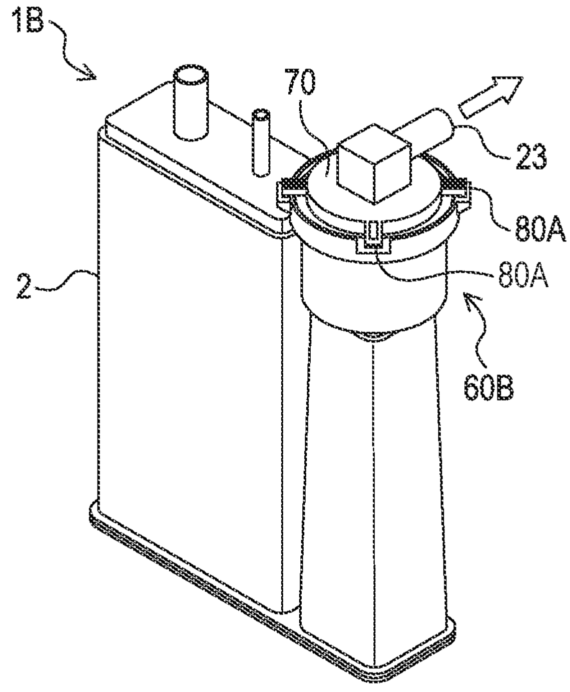
FIG. 5D is a perspective view of the lid having the installation angle of 90 degrees.

In the above configuration, one attachment angle of the lid 70 can also be selected from two or more attachment angles. For example, the reference axis can be defined as an axis along which the atmosphere port 23 is oriented toward the charge port 21 as illustrated in FIG. 5A. In this case, when the atmosphere port 23 is oriented in an opposite direction to the charge port 21 as in FIG. 5B, the attachment angle is 180 degrees. Furthermore, when the atmosphere port 23 is rotated by 90 degrees with respect to the reference axis as in FIGS. 5C and 5D, the attachment angle is 90 degrees or minus (−) 90 degrees.

Figure 6A:
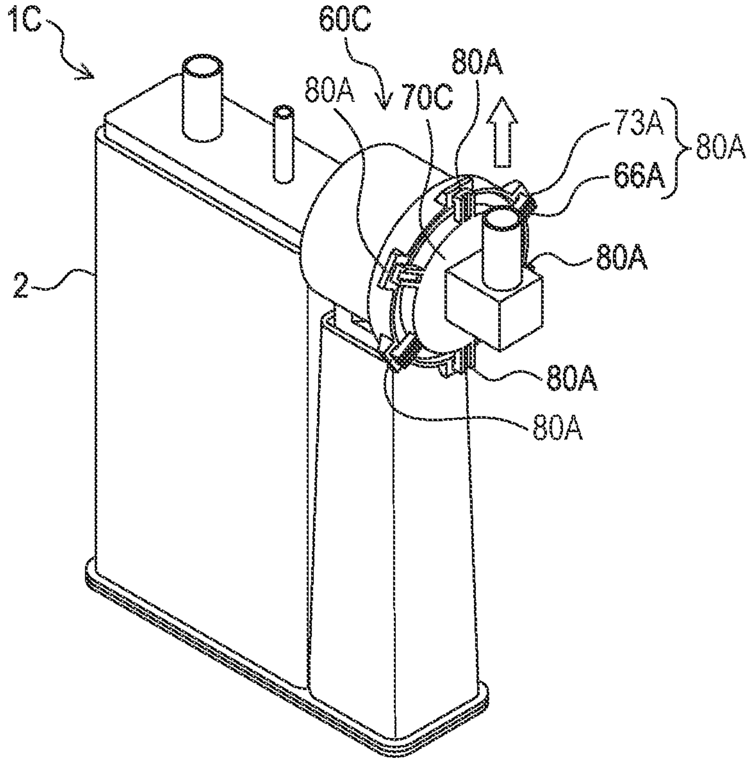
FIG. 6A is a perspective view illustrating an evaporated fuel treatment device according to a second modified example.

(2c) In the above-described embodiment, the auxiliary chamber 60 comprises the four first engagement portions 66A and the lid 70 comprises the four second engagement portions 73A, whereby the evaporated fuel treatment device 1A comprises the four snap-fit structures 80A. However, the snap-fit structures 80A are not limited to this configuration. For example, as in an evaporated fuel treatment device 1C according to a second modified example illustrated in FIG. 6A, there may be provided six snap-fit structures 80A. Specifically, the evaporated fuel treatment device 1C may comprise an auxiliary chamber 60C and a lid 70C. The auxiliary chamber 60C comprises six first engagement portions 66A and the lid 70C comprises six second engagement portions 73A. The six snap-fit structures 80A are arranged at intervals of 60 degrees, and are formed into the same shape.

Figure 6B:
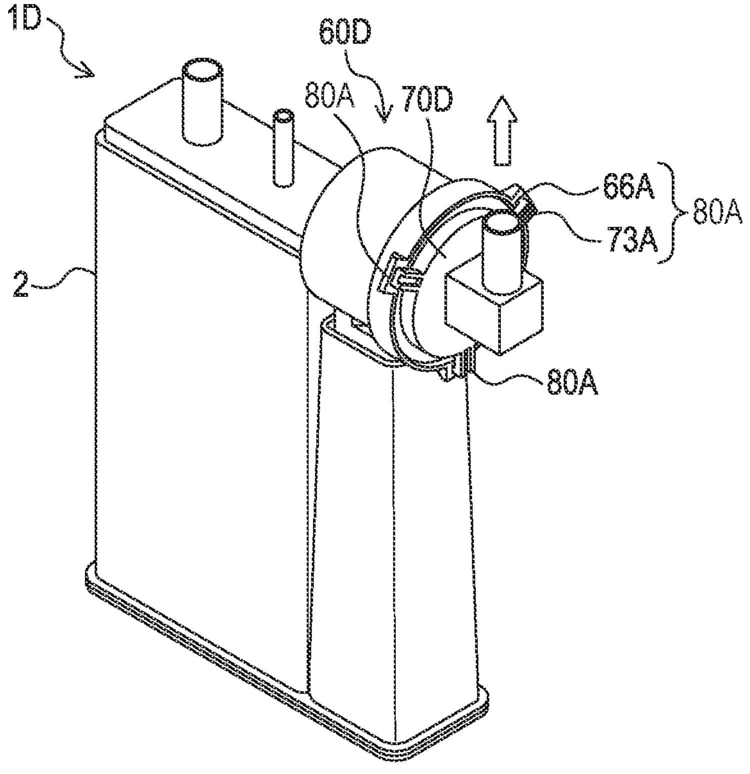
FIG. 6B is a perspective view illustrating an evaporated fuel treatment device according to a third modified example.

(2d) Similarly, there may be provided three snap-fit structures 80A as in, for example, an evaporated fuel treatment device ID according to a third modified example illustrated in FIG. 6B. Specifically, the evaporated fuel treatment device ID may comprise an auxiliary chamber 60D and a lid 70D. The auxiliary chamber 60D comprises three first engagement portions 66A and the lid 70D comprises three second engagement portions 73A. The three snap-fit structures 80A are arranged at intervals of 120 degrees, and are formed into the same shape.

(2e) In the above-described embodiment, all the snap-fit structures 80A are formed into the same shape. However, the snap-fit structures 80A are not limited to this configuration. The snap-fit structures 80A may be formed into any shape that makes the first engagement portions 66A engageable with the second engagement portions 73A. The first engagement portions 66A and the second engagement portions 73A may be or may not be the same in number. For example, the number of the first engagement portions 66A may be greater than the number of the second engagement portions 73A.

(2f) Two or more functions performed by one element in the aforementioned embodiment may be achieved by two or more elements. One function performed by one element may be achieved by two or more elements. Two or more functions performed by two or more elements may be achieved by one element. One function performed by two or more elements may be achieved by one element. Furthermore, a part of a configuration in the aforementioned embodiments may be omitted. Still further, at least a part of the configuration in the aforementioned embodiments may be added to or replaced with another part of the configuration in the aforementioned embodiments. It should be noted that any and all modes included in the technical ideas that are identified by the languages recited in the claims are embodiments of the present disclosure.

(2g) In addition to the evaporated fuel treatment device 1A described above, the present disclosure can be achieved in various modes such as a system comprising the evaporated fuel treatment device 1A and a method of treating an evaporated fuel.

Technical Ideas Disclosed in Present Disclosure

[Item 1]

An evaporated fuel treatment device with two or more ports, the evaporated fuel treatment device comprising:

a main body case; and a lid, the main body case including:

two or more adsorption chambers, each adsorption chamber of the two or more adsorption chambers accommodating an adsorbent therein;

an opening allowing a target adsorption chamber to communicate with the atmosphere, the target adsorption chamber being one of the two or more adsorption chambers, the lid including a target port, which is one of the two or more ports, the lid being configured to be attached to the main body case on an attachment surface, defined in advance in the main body case, so as to close at least a part of the opening, the target port being configured to guide a gas in a direction intersecting a flow direction of the gas in the target adsorption chamber, the lid being rotatable along a rotation direction prior to being attached to the main body case, to thereby (i) allow selection of one attachment angle from two or more attachment angles and (ii) be attached to the main body case, the rotation direction being a direction in which the lid is rotated along the attachment surface.

[Item 2]

The evaporated fuel treatment device according to Item 1, wherein the evaporated fuel treatment device further comprises a rotation inhibitor configured to inhibit the lid attached to the main body case from being rotated along the rotation direction.

[Item 3]

The evaporated fuel treatment device according to Item 1 or 2, wherein the evaporated fuel treatment device further comprises:

two or more first engagement portions arranged in the main body case, two or more second engagement portions arranged in the lid, the two or more second engagement portions being configured to be engageable with the two or more first engagement portions, respectively, and wherein the two or more first engagement portions and the two or more second engagement portions are arranged at respective positions that make the two or more first engagement portions and the two or more second engagement portions have rotational symmetry if rotated along the rotation direction.

What is claimed is:

1. An evaporated fuel treatment device with two or more ports, the evaporated fuel treatment device comprising:

a main body case; and a lid, the main body case including:

two or more adsorption chambers, each adsorption chamber of the two or more adsorption chambers accommodating an adsorbent therein;

an opening allowing a target adsorption chamber to communicate with an outside of the evaporated fuel treatment device, the target adsorption chamber being one of the two or more adsorption chambers, the lid including a target port, which is one of the two or more ports, the lid being configured to be attached to the main body case on an attachment surface, defined in advance in the main body case, so as to close at least a part of the opening, the target port being configured to guide a gas in a direction intersecting a flow direction of the gas in the target adsorption chamber, the lid being rotatable along a rotation direction prior to being attached to the main body case, to thereby allow selection of one attachment angle from two or more attachment angles and be attached to the main body case, the rotation direction being a direction in which the lid is rotated along the attachment surface.

2. The evaporated fuel treatment device according to claim 1, wherein the evaporated fuel treatment device further comprises a rotation inhibitor configured to inhibit the lid attached to the main body case from being rotated along the rotation direction.

3. The evaporated fuel treatment device according to claim 1, wherein the evaporated fuel treatment device further comprises:

two or more first engagement portions arranged in the main body case, two or more second engagement portions arranged in the lid, the two or more second engagement portions being configured to be engageable with the two or more first engagement portions, respectively, and wherein the two or more first engagement portions and the two or more second engagement portions are arranged at respective positions that make the two or more first engagement portions and the two or more second engagement portions have rotational symmetry if rotated along the rotation direction.

* * * * *